US011379846B2

(12) United States Patent
Howe

(10) Patent No.: US 11,379,846 B2
(45) Date of Patent: Jul. 5, 2022

(54) PRODUCT AUTHENTICATION OVER A PAYMENT NETWORK

(71) Applicant: MasterCard International Incorporated, New York, NY (US)

(72) Inventor: Justin X. Howe, San Francisco, CA (US)

(73) Assignee: Mastercard International Incorporated, New York, NY (US)

( * ) Notice: Subject to any disclaimer, the term of this patent is extended or adjusted under 35 U.S.C. 154(b) by 1005 days.

(21) Appl. No.: 14/500,867

(22) Filed: Sep. 29, 2014

(65) Prior Publication Data

US 2016/0092875 A1    Mar. 31, 2016

(51) Int. Cl.
*G06Q 20/00* (2012.01)
*G06Q 20/40* (2012.01)
*G06Q 30/00* (2012.01)
*G06Q 20/32* (2012.01)

(52) U.S. Cl.
CPC ....... *G06Q 20/405* (2013.01); *G06Q 20/3224* (2013.01); *G06Q 30/0185* (2013.01)

(58) Field of Classification Search
CPC .......... G06Q 2220/00; G06Q 2220/10; G06Q 2220/16
See application file for complete search history.

(56) References Cited

U.S. PATENT DOCUMENTS

| 8,534,513 | B1 | 9/2013 | Eker et al. | |
|---|---|---|---|---|
| 8,534,544 | B1 * | 9/2013 | Eker | G06K 9/00577 |
| | | | | 235/375 |
| 8,862,504 | B2 * | 10/2014 | Sobek | G06Q 20/20 |
| | | | | 235/383 |
| 8,863,504 | B2 * | 10/2014 | Bays | F01N 11/00 |
| | | | | 60/297 |
| 2004/0006514 | A1 * | 1/2004 | Rogers | G06Q 20/203 |
| | | | | 705/24 |
| 2005/0247778 | A1 * | 11/2005 | Roberts | G06Q 20/208 |
| | | | | 235/383 |

(Continued)

FOREIGN PATENT DOCUMENTS

| WO | WO-2010129245 A2 * | 11/2010 | ............. G06Q 20/10 |
|---|---|---|---|
| WO | 2013/060994 A1 | 5/2013 | |
| WO | 2013/165028 A2 | 11/2013 | |

OTHER PUBLICATIONS

Atteched Foreign Ref (Year: 2010).*

(Continued)

*Primary Examiner* — Dante Ravetti
(74) *Attorney, Agent, or Firm* — Sheppard Mullin Richter & Hampton LLP

(57) ABSTRACT

Systems and methods are provided for authenticating a product over a payment network. A product identifier associated with a product to be authenticated may be included or appended to a conventional authorization request message or clearing message during processing of a payment transaction. The product identifier can be verified at a verification entity to determine whether the product is real or counterfeit. Authorization or settlement of the payment transaction can be approved/processed if the product is determined to be real. Authorization or settlement of the payment transaction can be declined/withheld if the product is determined to be counterfeit.

7 Claims, 6 Drawing Sheets

(56) References Cited

U.S. PATENT DOCUMENTS

| | | | | |
|---|---|---|---|---|
| 2006/0224470 | A1* | 10/2006 | Garcia Ruano | G06Q 20/04 705/26.1 |
| 2008/0209503 | A1* | 8/2008 | Hess | G06F 21/12 726/1 |
| 2010/0299249 | A1* | 11/2010 | Carlson | G06Q 20/10 705/39 |
| 2012/0123924 | A1* | 5/2012 | Rose | G06Q 20/12 705/35 |
| 2012/0158580 | A1* | 6/2012 | Eram | G06Q 20/10 705/39 |
| 2013/0036024 | A1* | 2/2013 | Boettcher | G06Q 30/06 705/26.8 |
| 2013/0290187 | A1* | 10/2013 | Itwaru | G06Q 20/3227 705/44 |
| 2014/0052553 | A1* | 2/2014 | Uzo | G06Q 20/204 705/18 |
| 2014/0258108 | A1* | 9/2014 | Ekselius | G06Q 20/3227 705/41 |

OTHER PUBLICATIONS

Carlson Foreign Ref (Year: 2010).*
Wikipedia, Mpedigree, https://en.wikipedia.org/wiki/Mpedigree, pp. 1-3, accessed Aug. 18, 2017.
Tshabalala, How a low-tech solution is making a dent in Africa's gigantic fake medicine trade, ZDNet, http://www.zdnet.com/article/docker-strives-for-profit-with-new-enterprise-edition/, Apr. 18, 2014, pp. 1-3, accessed Aug. 18, 2017.
Cadwalladr, New Africa: Ghanaian tech innovator who led counterfeit drugs crackdown, The Guardian, https://www.theguardian.com/technology/2012/aug/26/new-africa-ghanaian-tech-innovator, Aug. 25, 2012, pp. 1-3, accessed Aug. 18, 2017.
Bate, Successfully Combating Fake Drugs in Africa, AEIdeas, http://www.aei.org/publication/successfully-combating-fake-drugs-in-africa/, Jun. 14, 2010, pp. 1-2, accessed Aug. 18, 2017.

* cited by examiner

PRODUCT AUTHENTICATION OVER A PAYMENT NETWORK

TECHNICAL FIELD

The present disclosure is generally related to electronic transaction processing. More particularly, the present disclosure is directed to systems and methods for integrating product authentication with payment authorization and clearing.

BACKGROUND

The use of payment cards for a broad spectrum of cashless transactions has become ubiquitous in the current economy, accounting for hundreds of billions of dollars in transactions during a single year. For example, MasterCard International Incorporated, one example of a payment card network, processes upwards of 1.2 million transactions per hour across 230 countries. Important aspects involved with the use of payment cards are the authentication of the payor/consumer using the payment card, as well as the authorization of the transaction based upon the availability of monies in the payor's/consumer's bank.

SUMMARY

In accordance with one embodiment, a method comprises including a product identifier in an authorization request message. The method further comprises processing the authorization request message to authorize a payment transaction and authenticate a product identified by the product identifier. Further still, the method comprises transmitting an authorization response message approving or declining the payment transaction depending upon whether or not the product is authenticated.

In accordance with another embodiment, a non-transitory computer-readable medium has computer executable program code embodied thereon. The computer executable program code is configured to cause a computer system to authorize payment for an e-commerce transaction. Moreover, the computer executable program code is configured to cause the computer system to include a product identifier in transaction information sent to a clearing system that includes e-commerce information associated with the e-commerce transaction for which payment was authorized. Further still, the computer executable program code is configured to cause the computer system to validate the e-commerce transaction information and authenticate the product identifier, and provide reconciliation based on the validated e-commerce transaction and authenticated product identifier.

In a further embodiment, a payment network comprises at least one server, and at least one memory module storing computer program code, wherein the at least one memory module and stored computer program code are configured to, with the at least one processor, cause the server to: parse a payment transaction message associated with a payment transaction to obtain a product identifier associated with a product to be purchased; transmit the product identifier to a verification entity for verification that the product is authentic; upon a determination that the product is authentic transmit a payment transaction response message approving the payment transaction; and upon a determination that the product is counterfeit, transmit a payment transaction response message declining the payment transaction.

BRIEF DESCRIPTION OF THE DRAWINGS

Further aspects of the present disclosure will be more readily appreciated upon review of the detailed description of its various embodiments, described below, when taken in conjunction with the accompanying drawings.

The drawings are described in greater detail in the description and examples below.

DETAILED DESCRIPTION

The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Figure 1:
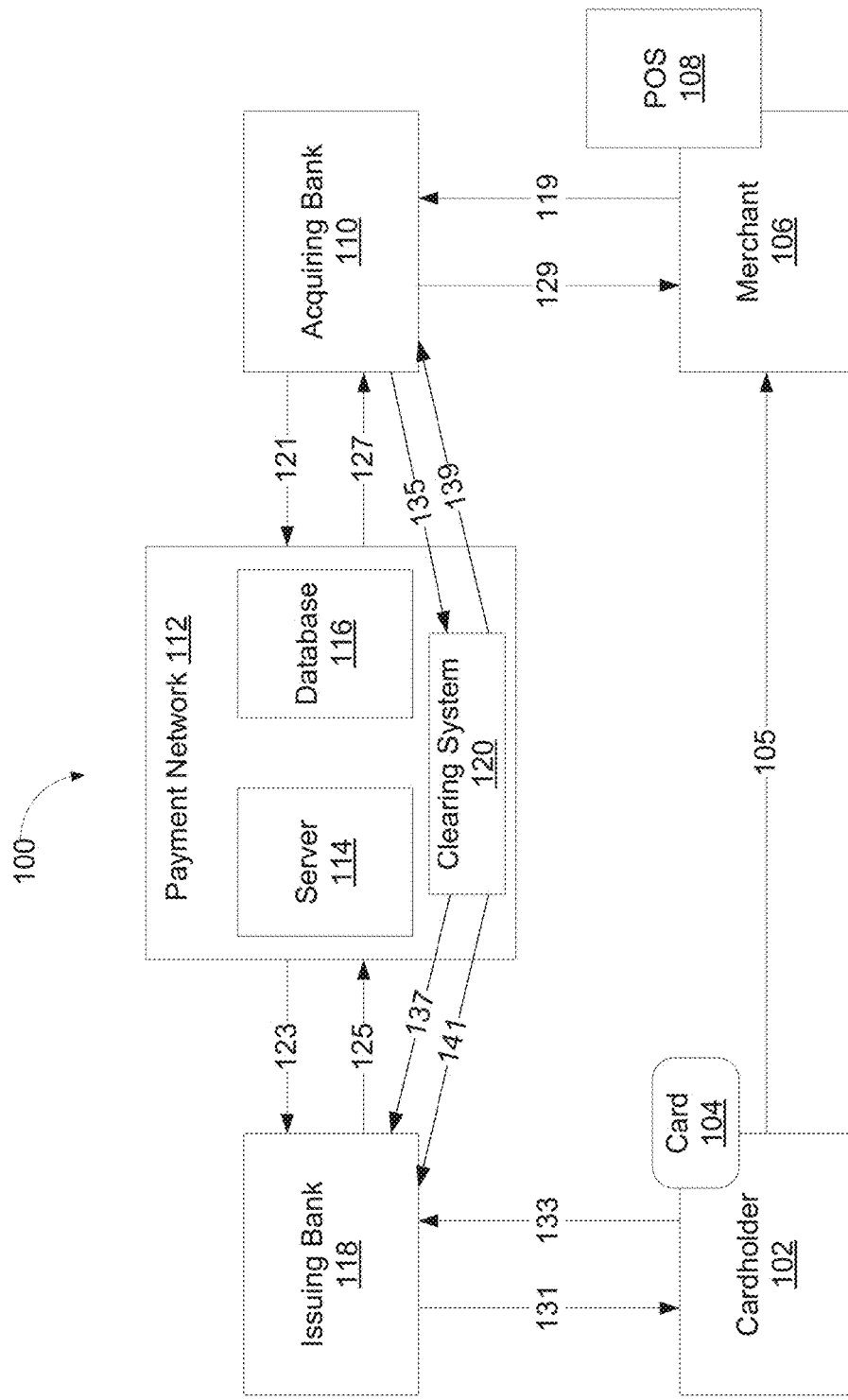
FIG. 1 illustrates an example payment card transaction processing system.

Transaction processing of electronic payments can include both an authorization side and a clearance side. The authorization side may involve the process of confirming that a cardholder has a sufficient line of credit to cover a proposed payment. The clearance side of the transaction may involve the process of moving funds from an issuing bank to an acquiring merchant bank. FIG. 1 depicts an example payment card transaction processing system 100 showing both the authorization side and the clearance side of card-based payments.

In a typical card-based payment system transaction, a cardholder 102 presents a credit/debit/prepaid card 104 to a merchant 106 for the purchase of goods and/or services. This transaction is indicated by arrow 105. A "card" 104, as used herein, can refer to a conventional magnetic-stripe credit, debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. A "card" 104 can further refer to virtual or limited use account numbers and electronic wallets.

It is understood that prior to the occurrence of such a transaction, cardholder 102 was issued card 104 by an issuing bank 118. Moreover, it will be understood that merchant 106 has established a relationship with an acquiring bank 110, thereby allowing merchant 106 to receive cards as payment for goods and/or services. That is, merchant banks and issuing banks may participate in various payment networks, including payment network 112. One such payment network is operated by MasterCard International Incorporated, the assignee of the present disclosure.

After presentation of card 104 to merchant 106 by cardholder 102, merchant 106 may send an authorization request (indicated by arrow 119) to acquiring bank 110 via a point-of sale (POS) terminal 108 located at or otherwise controlled by merchant 106. In turn, acquiring bank 110 communicates with payment network 112 (indicated by arrow 121), and payment network 112 communicates with issuing bank 118 (indicated by arrow 123) to determine whether cardholder 102 is authorized to make transaction 105. The issuing bank 118 either approves or declines the authorization request and thereafter transmits the response back to merchant 106 (indicated by arrows 125, 127 and 129). Merchant 106 may then either complete or cancel transaction 105 based upon the response to the authorization request.

If transaction 105 is approved, in accordance with processes called clearing and settlement, the transaction amount will be sent from issuing bank 118 through payment network 112 to acquiring bank 110. The transaction amount, minus certain fees, will thereafter be deposited within a bank account belonging to merchant 106. Issuing bank 118 thereafter bills cardholder 102 (indicated by arrow 131) for all transactions conducted over a given period of time by sending a cardholder statement to cardholder 102. Cardholder 102 follows by submission of payment(s) (as indicated by arrow 133) to issuing bank 118. This submission of payment(s) (as indicated by arrow 133) by cardholder 102 may be automated (e.g., in the case of debit transactions), may be initiated by cardholder 102 for the exact amount matching amounts of purchases during the statement period (e.g., charge cards or credit balances paid in full), and/or may be submitted (in part or in whole) over a period of time that thereby reflects the amount of the purchases, plus any financing charges agreed upon beforehand between cardholder 102 and issuing bank 118 (e.g., revolving credit balances).

Payment network 112 preferably includes at least one server 114 and at least one database 116. Server 114 may include various computing devices such as a mainframe, personal computer (PC), laptop, workstation or the like. Server 114 can include a processing device and be configured to implement an authorization and clearance process, which can be stored in computer storage associated with server 114. Database 116 may include computer readable medium storage technologies such as a floppy drive, hard drive, tape drive, flash drive, optical drive, read-only memory (ROM), random access memory (RAM), and/or the like. Server 114 and database 116 may be controlled by software/hardware and may store data to allow it to operate in accordance with aspects of the present disclosure.

POS terminal 108 is in data communication, directly or indirectly, and at least from time to time, with, e.g., an acquirer host computer (not shown) that is part of payment network 112 and is operated for or on behalf of acquiring bank 110, which handles payment card transactions for merchant 106. Server 114 may be operated by or on behalf of the payment network 112, and may provide central switching and message routing functions among the member financial institutions of the payment card network. Issuing bank 118 also preferably makes use of an issuer host computer (not shown), and an access point (not shown) via which the issuer host computer exchanges data messages with server 114. It should be noted that in practice, payment card transaction processing system 100 may involve a large number of cardholders, POS terminals, acquirer host computers, issuer host computers, and access points. In general, the acquirer host computer can receive authorization requests from POS terminals, forward the authorization requests through payment network 112, receive authorization responses, and relay the authorization responses to POS terminal 108. Moreover, the issuer host computer may in general, receive authorization requests from server 114 and transmit authorization responses back to server 114 with respect to the authorization requests.

It should be noted that the terms "authorization" and "authentication" may have distinct definitions in the context of electronic payment transactions. For example, the term authorization can refer to (as described above) the process by which issuing bank 118 approves or declines a transaction based on the availability of the requisite funds. Authentication can refer to the process of establishing the validity of card 104 and/or the account information associated with card 104 provided by cardholder 102. Authentication can be accomplished by manual processes such as verifying card ownership via physical ID (e.g., driver's license) and/or by utilizing one or more fraud prevention tools, such as an address verification service (AVS), card security codes (CVS)/card verification data (CVD), card verification code (CVC2), and the like. Moreover, merchant 106 may further utilize other authentication methods or processes including certain geolocation authentication mechanisms. In the case of debit payment transactions reliant upon the use of debit cards, a personal identification number (PIN) can be used for cardholder authentication. In accordance with various embodiments, authorization and/or authentication processes can be considered to be encompassed by the exchange of authorization information (e.g., authorization request and/or authorization responses/approval/decline messaging described herein).

Also included in a typical card-based payment system transaction are the clearing and settlement processes alluded to previously and described in greater detail below.

Clearing (which can happen after transmission of the authorization response if approved) can refer to a process by which issuing bank 118 exchanges transaction information with acquiring bank 110 (also referred to as the merchant bank). Referring back to FIG. 1, acquiring bank 110 can transmit transaction information to a clearing system 120 (indicated by arrow 135). Clearing system 120 can validate the transaction information, and forward it to acquiring bank 110 (indicated by arrow 137), which prepares data to be included on a payment statement for cardholder 102. Clearing system 120 may then provide reconciliation to both issuing bank 118 and acquiring bank 110 (indicated by arrows 139 and 141).

Settlement can refer to a process by which issuing bank 118 exchanges the requisite funds with acquiring bank 110 to complete an approved transaction. In particular, acquiring bank 110 may send clearing data in a clearing message to payment network 112, whereupon payment network 112 calculates a net settlement position and sends advisement to acquiring bank 110 and issuing bank 118. Issuing bank 118 can remit payment to payment network 112, which then sends the payment to acquiring bank 110. Acquiring bank 110 then pays merchant 106 for the purchase made by cardholder 102, and issuing bank 118 bills cardholder 102.

As previously alluded to, authentication/authorization procedures are important in the context of cashless/electronic payment transactions. For example, and without the ability to verify that a person/entity making a payment is authorized to make payment using, e.g., a credit card, such payment transactions cannot be trusted and the system becomes compromised. The same hold true for ensuring that the person/entity has the requisite funds to complete the payment transaction. Moreover, and in an age where the counterfeiting of products (e.g., consumer products such as brand name apparel, jewelry, sporting goods, etc.) has unfortunately become commonplace, consumers need protective measures to avoid being deceived by unscrupulous vendors/manufacturers.

The above is especially true where the authenticity of a product/service is of critical importance as is the case with pharmaceutical products, drugs, medicine, etc. For example, some estimates indicate that the counterfeit trade results in approximately 75 billion dollars per year of revenue for those that trade in counterfeit drugs. Additionally, the World Health Organization has opined that out of all the packets of medicine sold in street markets in developing countries, approximately 30 percent, are counterfeit. The ramifications of the sale of such counterfeit pharmaceuticals is even more disturbing in that up to 2,000 people die each day due to the use of substandard or counterfeit drugs.

In an attempt to address these issues, certain systems have been developed to allow for the authentication of pharmaceuticals. One such system is mPedigree. The mPedigree system relies on drug manufacturers working in conjunction with mPedigree by uploading identifying information from, e.g., each packet of medicine, to a central registry. Using mass serialization methods, the central registry can track a record of possession from the manufacturer through to various wholesalers, pharmacies, and ultimately to the end consumer or patient. Each packet of medicine associated with mPedigree may have some unique indicia printed on the packet packaging (such as a scratch surface with a hidden 12-digit numerical identifier). Upon purchasing the packet of medicine, the consumer may reveal the 12-digit numerical identifier and send a free short messaging service (SMS) message to query the central registry to determine whether that 12-digit numerical identifier exists in the central registry. If the identifier does exist in the registry, a return SMS message may be sent to the consumer letting the consumer know that he/she can be relatively certain that the packet of medicine is authentic.

However, certain deficiencies still exist with such systems. For example, the security associated with SMS messages may be minimal. Therefore, SMS messages may still be vulnerable to being intercepted, spoofed, or otherwise comprised. That is, a manufacturer of counterfeit pharmaceuticals may be able to produce packaging with fake indicia, intercept an SMS authentication request message sent by the consumer, including the fake indicia prior to reaching the central (mPedigree repository), and send a false confirmation SMS message replying to the SMS authentication request message.

Moreover, the use of such an authentication system relies on a payment transaction for the pharmaceutical product to be completed. That is, in order for a consumer or patient to receive the pharmaceutical product and have the ability to reveal the hidden 12-digital numerical identifier to confirm authenticity, payment has presumably already been made to a vendor (whether by cash or by some form of electronic payment). Hence, any realization that the already purchased pharmaceutical product is counterfeit relies on the ability of the consumer or patient to retroactively seek a refund and/or the willingness of the vendor to provide such a refund. Moreover, and besides the potential monetary loss, enforcement and/or regulatory actions against "fly-by-night" operations may be delayed or near-impossible once the payment transaction has been completed and the counterfeit drug dealer(s) has fled/moved operations.

Hence, systems and methods are provided for integrating product authentication with electronic payment authorization/authentication. In accordance with various embodiments, product authentication indicia, such as, for example, a numeric or alpha-numeric identifier, quick-response (QR) code, stock keeping unit (SKU), universal product code (UPC), a manufacturer part number (MPN), a European article number (EAN), or an international standard book number (ISBN), or some combination thereof, can be included, embedded, or otherwise integrated into a payment authorization/authentication message that is generally sent with authorizing an electronic payment transaction. In this way, the process of product authentication can be streamlined. Furthermore, the increased security associated with payment transaction authorization procedures can serve to also make the product authentication procedure more secure. Further still, the payment transaction can be halted/declined in the event that the product cannot be properly authenticated, thereby avoiding any potential loss of funds for a counterfeit product and/or provide the ability for any enforcement/regulator/reporting agency to effect action against a counterfeit dealer/manufacturer much sooner.

Figure 2:
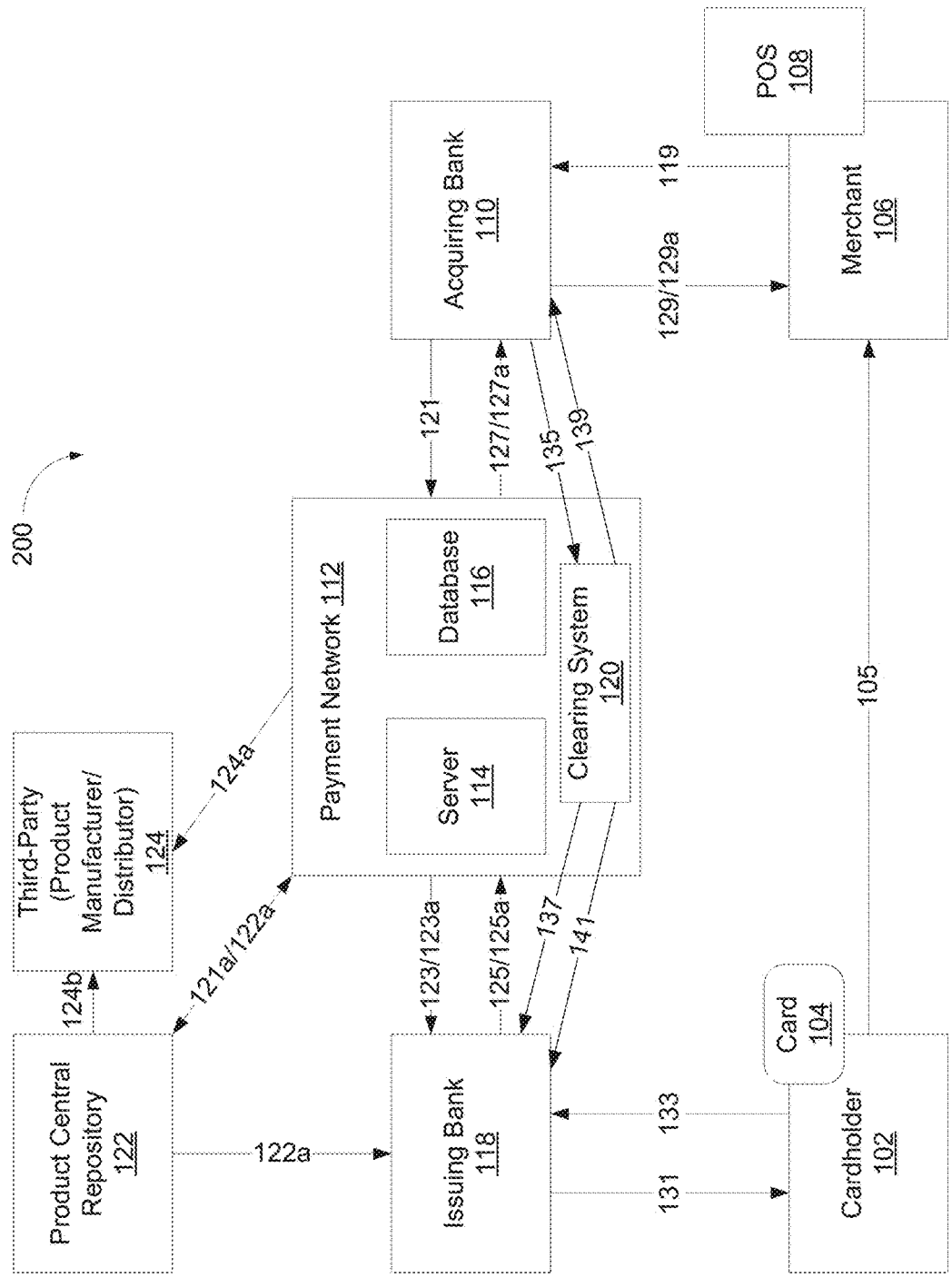
FIG. 2 illustrates an example payment card transaction processing system over which the authenticity of a product can be verified in accordance with various embodiments.

FIG. 2 illustrates an example payment card transaction processing system 200 in which product authentication may be integrated in accordance with various embodiments. Elements of system 200 may be considered to be the same or similar to like-numbered elements of FIG. 1, e.g., cardholder 102, card 104, merchant 106, POS 108, acquiring bank 110, payment network 112 (and its example constituent elements), and issuing bank 118. In addition to these elements, system 200 may further include a verification entity, such as a product central repository 122, with which product authentication may be verified. Product central repository 122 may include one or more servers, processors, and/or databases that can receive, e.g., product indicia, and match that product indicia with previously stored product indicia (if existent) therein.

Additionally, system 200 may include connectivity to a third-party 124, such as a product manufacturer, distributor, and the like. Such connectivity between payment network 112 and third-party 124 can allow payment network 112 to, e.g., notify third-party 124 when and/or where a counterfeit product has been discovered as being sold to a consumer/patient. Third-party 124 may also be communicatively connected to product central repository 122, where product central repository 122 may assume the task of notifying third-party 124 when/where a counterfeit product has been discovered. The aforementioned integration of product authentication with payment authorization, as well as such notification can occur in real-time or near-real-time. In accordance with other embodiments, such as may be the case in e-commerce payment transactions (e.g., web-based online purchases), some delay can be introduced, but in either scenario, combating the sale of counterfeit products and enforcement actions regarding the sale of counterfeit products can be initiated and/or performed much sooner than in conventional systems.

As described above, product indicia may be embedded or otherwise included in a payment authorization message to effect product authentication. In accordance with one embodiment, a product identifier, such as a unique serial number, SKU, UPC, or other identifying information can be added to payment transaction data as part of a cashless or electronic payment transaction. For example, and in a retail setting, the product identifier can be added to data that is conventionally gathered, e.g., an account number associated with card 104, an identification number of merchant 106/POS terminal 108, a transaction amount, etc. That is, a retail clerk at merchant 106 may manually enter the product identifier as another piece of transaction data.

In accordance with another embodiment, and in the event card 104 is, e.g., a debit card, cardholder 102 in possession of card 104 may enter the product identifier in addition to the entry of a PIN associated with card 104. Alternatively still, an application such as an interactive graphical user interface (GUI) may be displayed to cardholder 102 at POS terminal 108 that allows cardholder 102 to enter the product identifier. The interactive GUI may be added to the hardware and/or software used to implement POS terminal 108. For example, certain POS devices at pharmacies may already utilize an interactive GUI that, e.g., captures a consumer's signature or other identifying information in order to authorize the purchase of certain pharmaceutical products, such as those containing pseudoephedrine. Capturing of the product identifier can be added as another aspect of such an interactive GUI.

Other embodiments may utilize a mobile device payment application, such as that which can be implemented as a payment application on a tablet PC, a smart phone, or similar device. That is, the mobile device may act as a POS terminal. Accordingly, the mobile device payment application may include a mechanism, such as an interactive GUI that in addition to capturing conventional transaction data, may also allow for the entry of a product identifier of a product to be authenticated. For example, cardholder 102 may initiate and/or log on to such a mobile device payment application. Thereafter, cardholder 102 may enter the product identifier as well as, e.g., an identification number or code associated with merchant 106 to effectuate authentication of the product as well as payment to merchant 106. Cardholder 102 may have card 104 pre-associated with the mobile device payment application, and the identification number or code associated with merchant 106 can allow for payment with card 104 via the mobile device payment application.

In particular, and once the product identifier is included in or with the transaction data, that product identifier may be transmitted through system 200 in an authorization message as previously described. That is, and after presentation of card 104 to merchant 106 by cardholder 102, merchant 106 may send an authorization request including the product identifier and transaction data (indicated by arrow 119) to acquiring bank 110 via POS terminal 108 located at or otherwise controlled by merchant 106. In turn, acquiring bank 110 communicates with payment network 112 (indicated by arrow 121). Payment network 112 can parse the authorization message to obtain the included product identifier. Payment network 112, using, e.g., an application programming interface (API), can make a call to product central repository 122 to obtain authentication of a product associated with the product identifier (indicated by arrow 121a). It should be noted that although FIG. 2 represents a single product central repository 122 (there can be multiple repositories that payment network 112 can access, e.g., for different types of products). Additionally, such a repository need not be centralized, but can be embodied as a distributed system/network of repositories, or a hybrid combination of a centralized and distributed repository.

If the product identifier is deemed to be an invalid product identifier, e.g., the product identifier cannot be matched or associated with a valid product identifier stored in product central repository 122, product central repository 122 can indicate this determination to payment network 112 (indicated by arrow 122a). Payment network 112 can then adjust the authorization response. That is, payment network 122 can indicate to issuing bank 118 that the product is determined/believed to be counterfeit. This can be done in a separate message (indicated by arrow 123a) or as part of the communication with issuing bank 118 (indicated by arrow 123) to determine whether cardholder 102 is authorized to make transaction 105. Issuing bank 118 can then decline the authorization request and thereafter transmit the response back to merchant 106 (indicated by arrows 125, 127 and 129). Alternatively, payment network 112 can wait for issuing bank 118 to disprove the authorization request based on, e.g., lack of available funds or lack of cardholder 102 authentication. Payment network 112 may then add an indication regarding the additional basis for declining the authorization request (i.e., inability to authenticate the product) in the messaging back to merchant 106 via acquiring bank 110 (indicated by arrows 127 and 129) or with additional messaging (127a/129a). Merchant 106 may then cancel transaction 105 based upon the response to the authorization request. If it is deemed that the product is valid, messaging indicating this can be transmitted/exchanged between the elements of system 200 in a manner similar to that/the same as that described above, where merchant 106 can ultimately complete transaction 105.

In accordance with another embodiment, it can be issuing bank 118 that makes the determination to approve/decline the transaction. That is, issuing bank 118 can receive a message/indication (indicated by arrow 122a) from product central repository 122 that the transaction should be approved/declined based on whether the product identified by the product identifier used by payment network 112 to query product central repository 122 was authenticated. Issuing bank 118 may then approve/decline the authorization request as part of the "standard" approval/decline message 125 to payment network 112 or via a separate/additional message 125a.

As described above, certain delays may be encountered in an e-commerce scenario. Accordingly, product authentication can be integrated into the clearing process, rather than the authorization process in accordance with some embodiments. That is, and in e-commerce scenarios, there can be a delay in the transaction, e.g., between purchase order submission by cardholder 102 and obtaining the ordered product/shipping the ordered product. Hence, seeking authentication of a product during card/cardholder authorization would be ineffective because cardholder 102 will not yet have the product. Thus, in an e-commerce scenario, conventional authorization to verify available funds and/or the proper cardholder can be performed. Thereafter, and once a product is obtained/ready for shipment, merchant 106 may authenticate the product by embedding/appending a product identifier in the transaction information sent in a clearing record (e.g., when acquiring bank 110 transmits transaction information to payment network 112). In this way, the product can be authenticated (in the same or similar manner as that described above in a non-e-commerce scenario), but it is clearing system 120 of payment network 112 that can parse the product identifier from the transaction information/clearing record and authenticate the product via product central repository 122. Then, if the product is authenticated, the product can be shipped and settlement can be initiated with the transmission of the clearing data in a clearing message from acquiring bank 110 to payment network 112. If the product is not authenticated, the clearing message can be withheld, and the appropriate notification/messaging can be transmitted/exchanged, and subsequent actions for handling counterfeit product transactions (some of which have already been discussed above) can be performed.

It should be noted that payment network 112 may communicate with third-party 124 regarding when counterfeit products are identified (indicated by arrow 124*a*). Such communications may include individual instances of counterfeit product determination and/or collected reports, statistics, or similar information. In addition to indicating when counterfeit products have been identified, payment network 112 can notify third-party 124 about where/what merchant was involved in the attempted sale of counterfeit products. Such information can be gleaned from merchant identification numbers/codes/data that may be transmitted in transaction data (as described above). Alternatively, or in addition to payment network 112 communicating with third-party 124, product central repository 122 may also communicate with third-party 124 (indicated by arrow 124*b*) regarding the discovery of counterfeit products.

Figure 3:
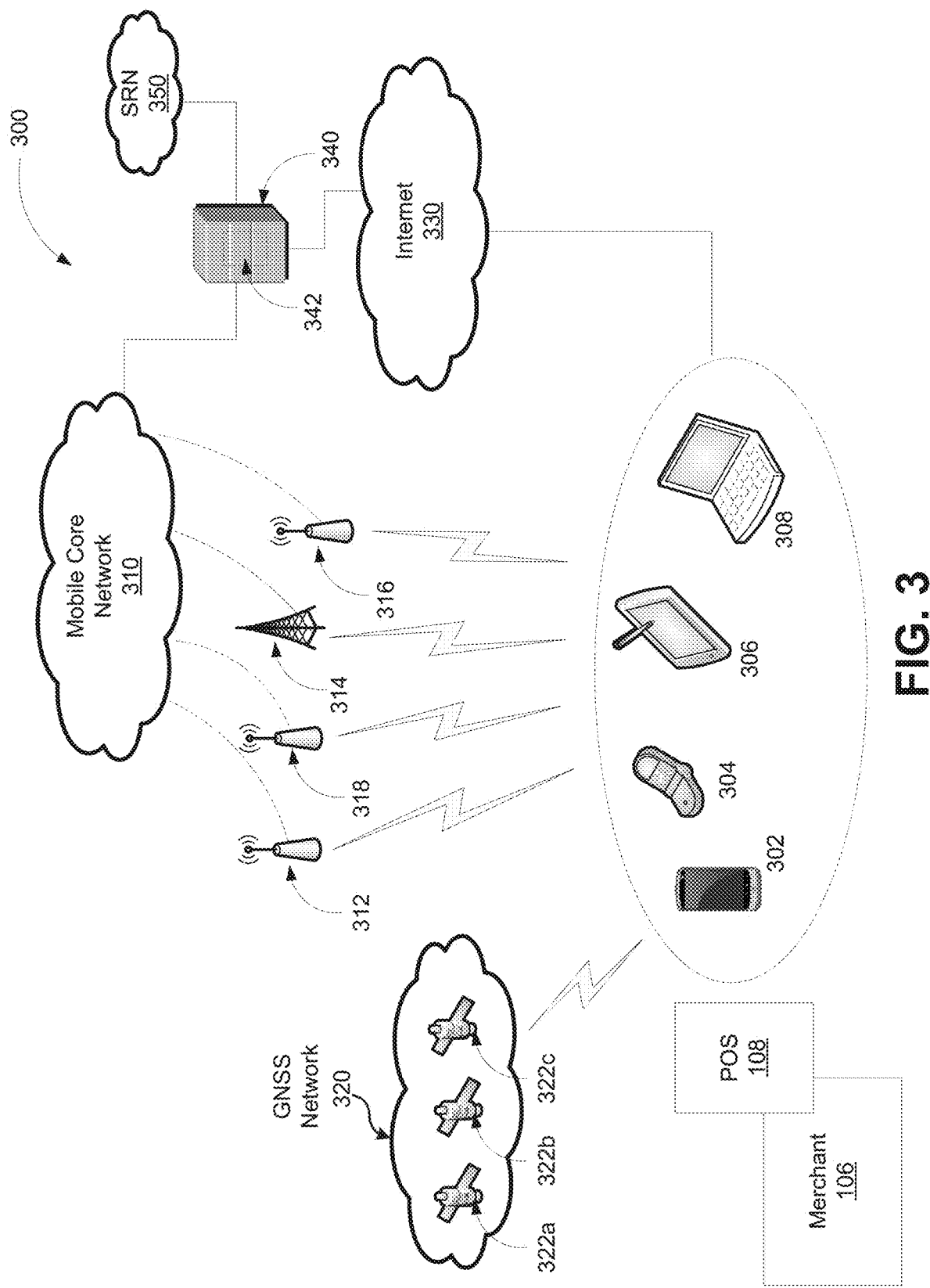
FIG. 3 illustrates an example communications system in which various embodiments may be implemented.

In the case of mobile device payment scenarios, the aforementioned mobile device payment application may be able to glean, e.g., geo-location information, or other merchant identifying information, regarding a merchant. FIG. 3 is a block diagram illustrating an exemplary communication system in which various embodiments may be implemented in accordance with the present disclosure. Referring to FIG. 3, a communications system 300 which includes a plurality of mobile devices, of which mobile devices 302-308 are illustrated. One or more of mobile devices 302-308 can include the aforementioned mobile device payment application for effecting electronic/cashless payment transactions and product authentication according to various embodiments described in the present disclosure. Example mobile devices may include a smart phone 302, a cellular device 304, a personal digital assistant (PDA) 306, and/or a tablet PC 308. Also shown in communication system 300 is a mobile core network 310, a wireless access point (AP) 312, a cellular base station (BS) 314, a Bluetooth® emitter 316, a Near Field Communication (NFC) terminal 318, a global navigation satellite system (GNSS) network 320, a plurality of GNSS satellites 322*a*-322*n*, an internet 330, a location server 340, and a satellite reference network (SRN) 350. One or more of mobile core network 310, wireless AP 312, cellular BS 314, Bluetooth® emitter 316, NFC terminal 318, GNSS network 320, GNSS satellites 322*a*-322*n*, internet 330, location server 340, and/or satellite reference network (SRN) 350 can be used in assisting to determine the location of one or more of the mobile devices 302-308 for use in the application and/or to provide communications links to the mobile devices 302-308 for allowing mobile devices 302-308 to communicate as described herein with respect to product authentication and payment transaction processing.

Wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. Wireless AP 312 may communicate with mobile core network 310 and/or internet 330, via one or more links and/or associated devices for example. In this manner, wireless AP 312 may provide network access to mobile devices 302-308.

Cellular BS 314 may include suitable logic, circuitry, interfaces, and/or code that are operable to provide voice and/or data services to communication devices, such as one or more of the mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). Cellular BS 314 may communicate with mobile core network 310 and/or internet 330, via one or more backhaul links and/or associated devices for example. In this manner, cellular BS 314 may provide network access to mobile devices 302-308, enabling a mobile device running a mobile device payment application, such as smart phone 302, to communicate with one or more databases, services, servers, etc. as described herein.

Bluetooth® emitter 316 may include suitable logic, circuitry, interfaces, and/or code that are operable to provide Bluetooth® based connectivity to communication devices, such as one or more of mobile devices 302-308, in adherence with various Bluetooth® and/or Bluetooth® Low Energy (BLE) standards. Bluetooth® emitter 316 may communicate with mobile core network 310 and/or internet 330, via one or more backhaul links and/or associated devices for example. In this manner, Bluetooth® emitter 316 may provide network access to mobile devices 302-308, enabling a mobile device running a mobile device payment application, such as smart phone 302 to communicate with, e.g., merchant 106/POS terminal 108.

NFC terminal 318 may include suitable logic, circuitry, interfaces, and/or code that can provide NFC-based connectivity to communication devices, such as one or more of the mobile devices 302-308, in adherence with various short range communication standards such as the Near Field Communications standards. The NFC terminal 318 may communicate with the mobile core network 310 and/or the internet 330, via one or more backhaul links and/or associated devices for example. In this manner, the NFC terminal 318 may provide network access to the mobile devices 302-308. One example implementation of an NFC terminal 318 is for use in a contactless payment system and/or for communicating with, e.g., merchant 106/POS terminal 108.

Mobile core network 310 may include suitable logic, circuitry, interfaces, and/or code that are operable to provide interfacing and/or connectivity servicing between access networks, which may be utilized by the mobile devices 302-308, and external data networks such as packet data networks (PDNs) and/or internet 330. Mobile core network 310 may correspond to one or more service providers that provide, control, and/or manage network accessibility available via mobile devices 302-308. In this regard, mobile devices 302-308 may access the mobile core network 310 via wireless AP 312, cellular BS 314, Bluetooth® emitter 316, and/or NFC terminal 318. Mobile core network 310 may communicate various data services, which are provided by external data networks, to associated user devices such as, for example, mobile devices 302-308. In an example aspect of the disclosure, in instances where a mobile device payment application is provided to a user device such as smart phone 302, mobile core network 310 may be operable to communicate with location server 340 to obtain location information that can be used by the mobile device payment application to, e.g., ascertain a location of merchant 106.

Each of mobile devices 302-308 may include suitable logic, circuitry, interfaces, and/or code for implementing various aspects of the embodiments disclosed herein. In this regard, each of mobile devices 302-308 may be operable to communicate via a plurality of wired and/or wireless connections. Each of mobile devices 302-308 may be operable, for example, to transmit to and/or receive signals from one or more of wireless AP 312, cellular BS 314, Bluetooth® emitter 316, NFC terminal 318, GNSS network 320, and/or internet 330. Also, each of mobile devices 302-308 may be operable to communicate with, and/or receive services provided by internet 330 and/or mobile core network 310. In this regard, mobile devices 302-308 may be operable to utilize mobile device payment applications, which can utilize location server 340.

GNSS network 320 may include suitable logic, circuitry, interfaces, and/or code that may provide navigation information to land-based devices via satellite links. In this regard, GNSS network 320 may include, for example, a plurality of GNSS satellites 322a-322n, each of which is operable to provide satellite transmissions based on a GNSS. Exemplary GNSS systems may include, for example, GPS, GLONASS, Galileo-based satellite system, Beidou and/or Compass systems. Accordingly, GNSS network 320 may be operable to provide positioning information via downlink satellite links transmitted from one or more of the plurality of GNSS satellites 322a-322n to enable land-based devices, such as the mobile devices 302-308, to determine their locations. The plurality of GNSS satellites 322a-322n may directly provide positioning information and/or a land-based device may utilize satellite transmissions from different satellites to determine its location using, for example, triangulation based techniques.

SRN 350 may include suitable logic, circuitry, interfaces, and/or code that are operable to collect and/or distribute data for GNSS satellites on a continuous basis. SRN 350 may include a plurality of GNSS reference tracking stations located around the world to provide A-GNSS coverage all the time in both a home network and/or any visited network. In this regard, SRN 350 may utilize satellite signals received from various GNSS constellations, such as, for example, the plurality of GNSS satellites 322a-322n of GNSS network 320.

Location server 340 may include suitable logic, circuitry, interfaces, and/or code that are operable to provide and/or support location based services. In this regard, location server 340 may be operable to store and/or process location related information pertaining to communication devices in system 300, such as one or more of mobile devices 302-308. The location information may be stored in a location reference database 342 in location server 340. Location server 340 may be operable to collect and/or retrieve location information from communication devices. Location server 340 may also be operable to access additional and/or dedicated entities, such as SRN 350 for example, to collect GNSS satellite data, and may be operable to utilize the collected GNSS satellite data to generate GNSS assistance data (A-GNSS data) including, for example, ephemeris data, long term orbit (LTO) data, reference positions and/or time information. Location server 340 may communicate the stored location data when requested to do so.

In operation, location server 340 may be utilized to provide location based services (LBS) in system 300. Location server 340 may maintain, for example, location reference database 342, which may include elements corresponding to each of mobile devices 302-308. Location server 340 may access SRN 350 to collect GNSS satellite data, and may utilize the collected GNSS satellite data to generate GNSS assistance data (A-GNSS data) pertaining to the mobile devices 302-308. Location server 340 may also collect and/or retrieve location information directly from mobile devices 302-308, and/or from other associated entities that interact with mobile devices 302-308 in system 300, such as, for example, wireless AP 312, cellular BS 314, Bluetooth® emitter 316, and/or NFC terminal 318. The retrieved location information may be stored in location reference database 342 in location server 340. Location server 340 may communicate the stored location data, e.g., when requested to do so. Location reference database 342, maintained in location server 340, may be modified, refined, and/or updated using retrieved location information. Location information stored and/or maintained by location server 340 may be utilized to augment and/or substitute for location information received and/or generated based on communication with GNSS network 320, for example, when communication with GNSS network 320 is disturbed.

The location data may also be locally generated, and/or maintained thereafter by devices and/or entities other than location server 340. In this regard, location related data, which typically may be generated and/or maintained by location server 340, may be locally generated, maintained, and/or used by mobile devices 302-308, and/or by service providers thereof. Accordingly, devices and/or entities that typically may be serviced by location server 340, such as mobile devices 302-308, may also perform location related servicing locally. Furthermore, locally generated and/or maintained location related data may be uploaded from mobile devices 302-308, and/or service providers thereof, to location server 340. Uploading the location related data may be performed periodically, on request, and/or based on the configuration of the client devices or entities, and/or location server 340 itself.

The location information stored and/or maintained in location server 340 may be utilized to authenticate, for example, one or more of mobile devices 302-308, users thereof, and/or locations thereof during operations performed by mobile devices 302-308. In this regard, service providers, who may provide access servicing to mobile devices 302-308, may contact location server 340 to request that location server 340 perform authentication procedures, and/or to obtain information necessary for performing the authentication procedures. The service providers may include, for example, cellular, Bluetooth®, WLAN, and/or NFC services providers. For example, a service provider of one of mobile devices 302-308 may request authenticating the mobile device, its user, and location at a given instance. Location server 340 may then perform the necessary authentication procedures, which may be based on existing information in location reference database 342, which is maintained by location server 340. Location server 340 may also perform authentication procedures based on current information, which may be obtained by, for example, communicating with the mobile device, to verify its present location and/or connectivity status or parameters. In this regard, location server 340 may communicate with the mobile device using IP packets that may be communicated via internet 330, which may be transmitted to and/or received by the mobile device via its internet connectivity, and/or via its network access via wireless AP 312, cellular BS 314, Bluetooth® emitter 316, and/or NFC terminal 318.

Internet 330 may include a system of interconnected networks and/or devices that enable exchange of information and/or data among a plurality of nodes, based on one or more networking standards, including, for example, Internet Protocol (IP). Internet 330 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

Various devices and/or user identification information may be utilized during network access and/or communications, which may be structured, allocated, and/or assigned based on the specific wired and/or wireless protocols that are used to facilitate any such network access and/or communication. For example, in GSM and/or WCDMA based networks, International Mobile Equipment Identity (IMEI) parameters may be utilized to uniquely identify mobiles devices, and these IMEI parameters may also be used and/or traced back to the mobile devices' users. Service providers may utilize the device and/or user identification information to track mobile devices and/or users. The service providers may track devices and/or users for various reasons, including, for example, billing or usage monitoring, and/or to help locate mobile devices, and/or their users, in cases of emergency and/or law enforcement purposes. Tracking of devices may also be used to provide authorized LBS and/or real-time device location information which can be utilized by mobile device payment applications, such as exemplary embodiments of the mobile device payment application according to the present disclosure, running on the mobile device or other devices and/or systems.

Conventional payment transactions can be premised on International Organization for Standardization (ISO) 8583, which defines a message format and communication flow for payment transactions (i.e., financial transaction card originated messages) in electronic fund transfers at a POS terminal. For example, MasterCard bases authorization communications on ISO 8583. Because ISO 8583 defines system-to-system messaging for secure key exchanges, messaging may be considered secure and appropriate for transmitting a product identifier. Although various embodiments may be herein described in the context of utilizing the ISO 8583 messaging format, other formats whether known or developed and implemented specifically to address product authentication over a payment network, can be utilized.

An ISO 8583 message can be made of the following parts: a message type indicator (MTI); one or more bitmaps indicating which data elements are present; and data elements, i.e., the fields of the message. Accordingly, a new message type can be defined to include a product identifier in addition to conventional transaction data in an authorization message and/or clearing message. Alternatively, a product identifier can be appended to one or more existing/ currently defined data fields in an authorization or clearing message. Returning to FIG. 2, an entire authorization or clearing message can be sent to product central repository 122, where product central repository 122 can parse the authorization or clearing message to obtain the data field having the product identifier for authentication. Alternatively, payment network 112/clearing system 120 can parse the authorization/clearing message in order to extract the product identifier for authentication at product central repository 122. It should be noted that in the event that the product identifier is different from, e.g., a UPC or SKU-level code, such UPC or SKU information could be included in the transaction data in accordance with certain conventional payment transactions. However, and from a privacy perspective, some embodiments may strip or prevent the transmittal of UPC, SKU, or other information that could link a particular consumer/patient to the use of certain products. Accordingly, in some embodiments, only the product identifier is included in the transaction data/information to protect consumer privacy with regard to, e.g., pharmaceutical or other sensitive purchases.

Figure 4:
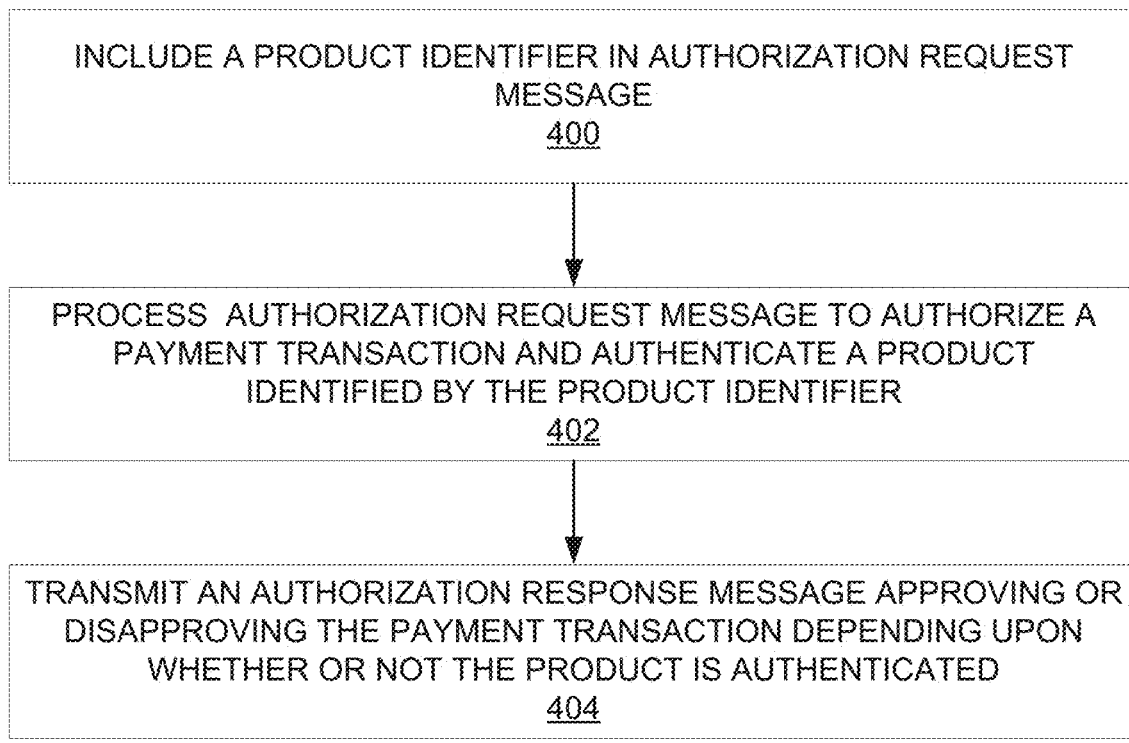
FIG. 4 is a flow chart illustrating various operations that may be performed to authenticate a product in accordance with one embodiment.

FIG. 4 illustrates a flow chart describing various processes that can be performed in order to authenticate a product in a payment processing network in accordance with one embodiment. At operation 400, a product identifier is included in an authorization request message. As described above, the product identifier may be received, depending on what perspective is being considered, at a POS terminal, a mobile device payment application, an acquiring bank 110, and/or a payment network 112. The product identifier can be received pursuant to the initiation of a payment transaction process and/or during processing of a payment transaction. Inclusion of the product identifier can be achieved by appending the product identifier in an authorization request message as part of a conventional authorization request message, for example, by way of a newly defined data field or as part of an existing data field. At operation 402, the authorization request message is processed to authorize a payment transaction and to authenticate a product identified by the product identifier. That is, and during payment/ cardholder authorization/authentication, the product identifier may be determined by, e.g., parsing the authorization request message, and transmitting the product identifier to a verification entity, such as product central repository 122, to determine if the product is authentic. At operation 404, an authorization response message is transmitted, the authorization response message approving or declining the payment transaction depending upon whether or not the product is authenticated.

Figure 5:
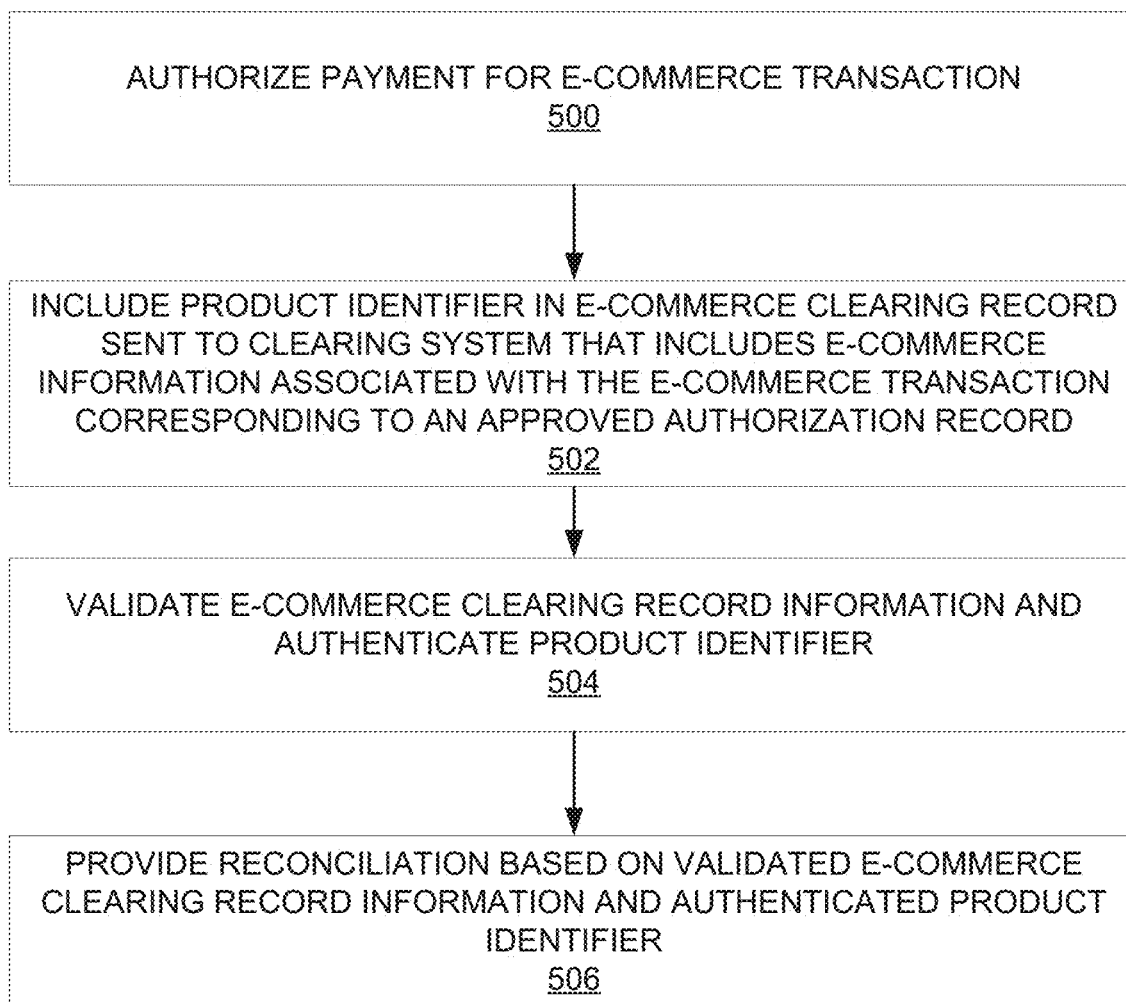
FIG. 5 is a flow chart illustrating various operations that may be performed to authenticate a product in accordance with another embodiment.

FIG. 5 illustrates a flow chart describing various processes that can be performed in order to authenticate a product in a payment processing network in accordance with another embodiment. For example, and in an e-commerce scenario, at operation 500, payment for an e-commerce transaction is authorized. Once a product is obtained/ready to be shipped upon authorization of the e-commerce transaction, at operation 502, a product identifier is included in an e-commerce clearing record sent to a clearing system that includes e-commerce information associated with the e-commerce transaction corresponding to an approved authorization record. As described above, it may be a clearing system of a payment network that verifies whether a product associated with the product identifier is real or counterfeit. At operation 504, the e-commerce clearing record is validated and the product identifier is authenticated. At operation 506, reconciliation for the e-commerce transaction is provided based on the validated e-commerce clearing record and the authenticated product identifier. Thereafter, the product can be shipped and settlement can be initiated with the transmission of the clearing data in a clearing message from an acquiring bank to the payment network. It should be noted that although various embodiments are described in the context of an e-commerce scenario, other embodiments of product authentication during clearing can adapted for use in m-commerce scenarios, e.g., mail order purchases, telephone order purchases, etc.

Figure 6:
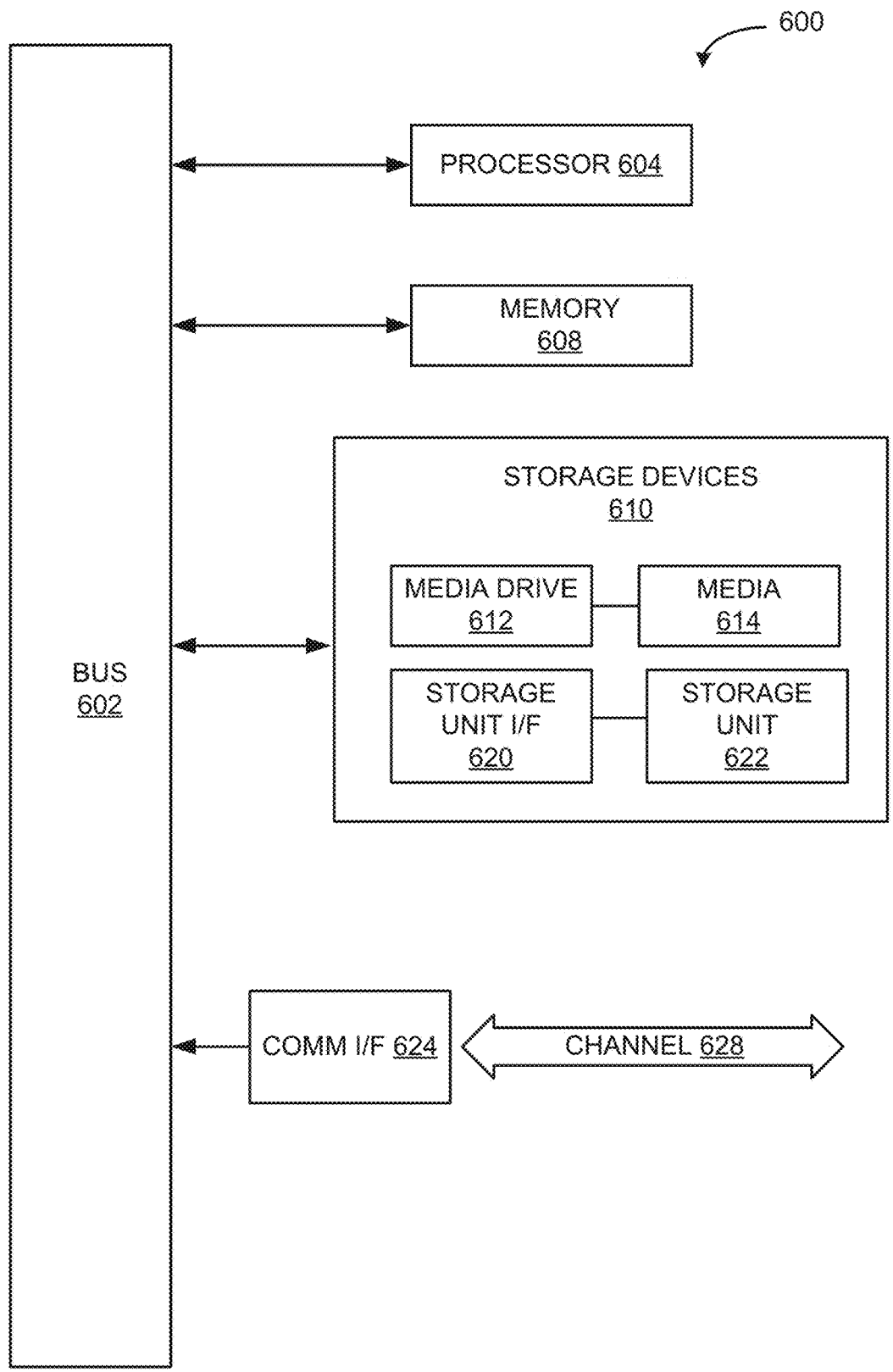
FIG. 6 illustrates an example computing module that may be used in implementing features of various embodiments.

FIG. 6 illustrates an example computing module 600, an example of which may be a processor/controller resident on a mobile device or POS terminal, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example—computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage devices 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 622 and a storage unit interface 620. Examples of such storage units 622 and storage unit interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit interface 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for product authentication over a payment network, the method comprising:
   obtaining, by a computing apparatus of a payment network, a payment transaction authorization request for a product to be purchased sent from one of a mobile device payment application or a merchant point-of-sale (POS) terminal via a payment network, wherein payment transaction authorization request comprises payment transaction information;
   parsing, by the computing apparatus of the payment network, the payment transaction information of the payment transaction authorization request to obtain a product identifier associated with the product to be purchased;
   establishing, by the computing apparatus of the payment network, a connection between the payment network and a data repository located on a computing apparatus of a third-party network by using an application programming interface (API) of the computing apparatus of the payment network to access the computing apparatus third-party network;
   authenticating, by the computing apparatus of the payment network, the product identified by the product identifier by comparing the product identifier to one or more valid product identifiers stored in the data repository;
   obtaining, by the computing apparatus of the payment network, an authentication response message in response to locating the product identifier in the data repository; and
   transmitting, by the computing apparatus of the payment network, an authorization response message approving payment transaction for the product to be purchased to the merchant (POS) terminal.

2. The method of claim 1, wherein the method for product authentication over a payment network further comprises receiving the product identifier by one of the mobile device payment application or the POS terminal at a time of purchase of the product and transmitting the product identifier by the POS terminal to an acquiring bank associated with a merchant of the product.

3. The method of claim 1, wherein the processing of the authorization request message comprises transmitting the authorization request message to at least one of an acquiring bank associated with a merchant of the product, a cashless payment network, and an issuing bank associated with a purchaser of the product.

4. The method of claim 1, further comprising transmitting, from at least one of the data repository and the payment network to at least one of manufacturer and distributor of the product, a notification that the product is counterfeit upon a determination that the product cannot be authenticated.

5. The method of claim 1, further comprising adjusting the authorization response to indicate the payment transaction has been declined upon a determination that the product cannot be authenticated.

6. The method of claim 4, wherein the transmitting of the notification comprises including information identifying at least one of a merchant that attempted to sell the product and a location at which the payment transaction was initiated.

7. The method of claim 1,
   wherein the obtaining the payment transaction authorization request for the product to be purchased comprises obtaining a payment transaction authorization request for a pharmaceutical product.

* * * * *